Patented Oct. 15, 1940

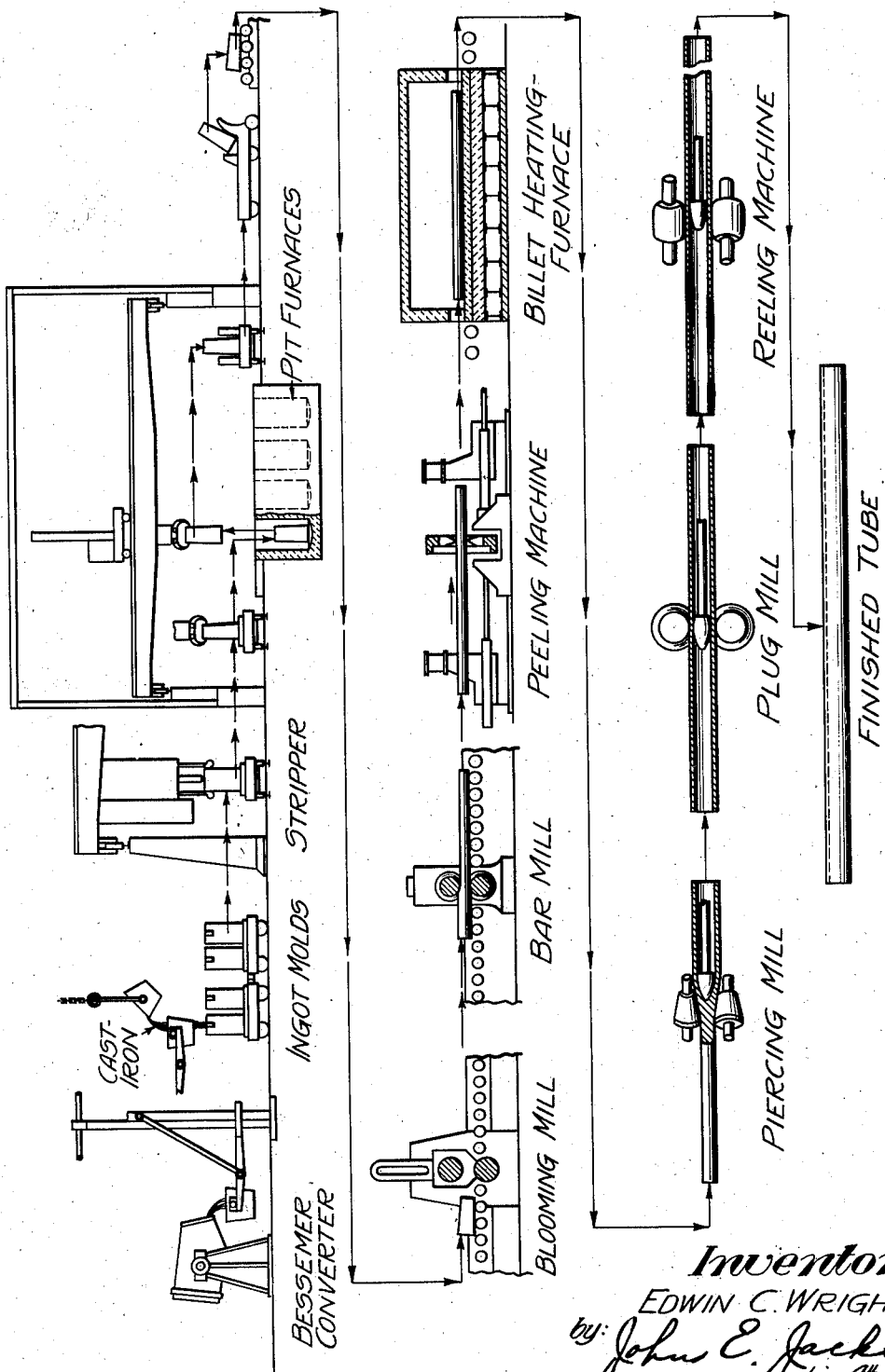

2,218,458

UNITED STATES PATENT OFFICE 2,218,458

MAKING OF SEAMLESS STEEL TUBES

Edwin C. Wright, Beaver, Pa., assignor to National Tube Company, a corporation of New Jersey Application October 7, 1939, Serial No. 298,467

5 Claims. (Cl. 29—156)

This invention is concerned with economically making seamless steel tubes in large quantities, the primary object being to carry out the step of making the steel by using a Bessemer converter instead of the more expensive open hearth furnace or electric furnace, when the making of the tubes includes the step of piercing solid billets in a seamless tube piercing mill.

According to the invention, the step of making the steel is carried out in a Bessemer converter with its attendant economies in time and money. A subsequent step is to pour the molten steel produced by the converter into a ladle and to pour molten pig iron into this ladle. By properly proportioning the amount of pig iron used to the quantity of steel in the ladle, it is possible to deoxidize the steel to a degree of oxidation not exceeding that of steel made in a basic open hearth furnace, without materially increasing the carbon content of the steel.

Steel produced in a Bessemer converter contains large amounts of oxygen normally necessitating its being processed as either a rimming or a conventionally capped steel that is not adapted for use in conjunction with the billet piercing step in so far as the economical quantity production of seamless tubes is concerned. The steel cannot be produced satisfactorily as a killed steel because it contains so much oxygen that prior art methods of deoxidation are impractical. This discussion applies when the steel is not recarburized to a carbon content of more than .50%.

After this deoxidation with the pig iron step, the steel is completely killed and formed into solid ingots. Succeeding steps include rolling the solid ingots into billets, piercing these billets in a seamless tube piercing mill and processing the pierced billets into finished seamless steel tubes. These steps may be carried out in practically the same manner as when the step of making the steel is carried out by resorting to a basic open hearth furnace or an electric furnace.

As a specific example of the invention, steel is made in two conventionally operated 25 ton Bessemer converters and is poured into a 50 ton steel ladle. This steel is very low in carbon and very high in its oxygen content, it having an FeO content of about .50%. This oxygen content is reduced by adding about 3000 pounds of molten pig iron containing approximately 4.% carbon, the pig iron being poured into the steel in the ladle and initially raising its carbon content to over .20%. When the pig iron is added a vigorous reaction takes place, the carbon combining with the oxygen in the steel and escaping, presumably, as CO gas. This reaction is allowed to proceed to practical completion, at which time the carbon content of the molten steel in the ladle drops to approximately from .10% to .12% while the FeO content of the steel is lowered to about .15% or less.

At this time ferrosilicon is added to the molten steel to provide the finished steel with a silicon content of from .15% to .20%, along with sufficient manganese to provide the finished steel with a manganese content of from .30% to 1.%, as desired. Aluminum in the ratio of from 1 to 2 pounds per ton of molten steel is subsequently added to completely kill the steel. The steel can be cast in molds with hot tops, if desired.

It is to be particularly noted that the addition of from 30 to 40 pounds of molten pig iron per ton of molten steel that is highly oxidized by being made in a Bessemer converter, results in a steel that is at most no more oxidized than is equally low carbon steel made in a basic open hearth furnace, whereby this steel can be completely killed by the use of ordinarily small amounts of aluminum. This killed steel is adapted to be used in conjunction with the succeeding steps necessary to produce seamless steel tubes, namely, by being formed into solid ingots which are then rolled into suitable billets, the billets being pierced in a seamless tube piercing mill and the resulting pierced billets being processed into finished seamless steel tubes. Furthermore, the steps can be carried out so as to economically produce large quantities of the tubes.

The various steps disclosed herein are illustrated by the accompanying drawing. In this drawing the various steps are identified by legends, it being understood that conventional equipment may be used in carrying out these steps.

I claim:

1. In the art of making seamless steel tubes, the steps of making molten steel in a Bessemer converter, deoxidizing this molten steel by adding molten pig iron to it, forming solid ingots from the deoxidized molten steel, rolling the solid ingots into billets, piercing the billets in a seamless tube piercing mill and processing the pierced billets into finished seamless steel tubes, the pig iron being added to the molten steel produced by the Bessemer converter in amounts providing sufficient carbon to combine with the majority of the oxygen in the steel without causing material increase in the carbon content of the steel.

2. In the art of making seamless steel tubes, the steps of making molten steel in a Bessemer converter, pouring this molten steel in a ladle, pouring molten pig iron in the ladle with the steel therein in the amount of about from 30 to 40 pounds of pig iron per ton of steel, allowing reaction to proceed to substantial completion between the carbon in the pig iron and the oxygen in the steel, casting the steel into ingot molds and producing solid ingots, rolling the solid ingots into billets, piercing these billets in a seamless tube piercing mill and processing the resulting pierced billets into finished seamless steel tubes.

3. In the art of making seamless steel tubes, the steps of making molten steel in a Bessemer converter, pouring this molten steel in a ladle, pouring molten pig iron in the ladle with the steel therein in the amount of about from 30 to 40 pounds of pig iron per ton of steel, allowing reaction to proceed to substantial completion between the carbon in the pig iron and the oxygen in the steel, casting the steel into ingot molds and producing solid ingots, rolling the solid ingots into billets, piercing these billets in a seamless tube piercing mill and processing the resulting pierced billets into finished seamless steel tubes, the pig iron functioning to deoxidize the steel as it is made in the Bessemer converter to a degree of oxidation not exceeding that of steel of comparable carbon content made in a basic open hearth furnace and the steel being completely killed prior to its solidification into ingots.

4. In the art of making seamless tubes, the steps of making molten steel in a Bessemer converter, adding molten pig iron to this steel in an amount sufficient to deoxidize the steel as it is made in the Bessemer converter to a degree of oxidation not exceeding that of steel of comparable carbon content made in a basic open hearth furnace and insufficient to raise the carbon content of said steel to more than .50 percent, allowing the reaction between the carbon in the pig iron and the oxygen in the steel to proceed to substantial completion, casting the deoxidized steel into ingot molds and producing solid ingots, said steel being completely killed prior to its solidification into ingots, rolling the solid ingots into billets, piercing these billets in a seamless tube piercing mill and processing the resulting pierced billets into finished seamless tubes.

5. In the art of making seamless tubes, the steps of making molten steel in a Bessemer converter, adding molten pig iron to this steel in an amount of at least 30 lbs. or more per ton of steel, allowing the reaction between the carbon in the pig iron and the oxygen in the steel to proceed to substantial completion, casting the deoxidized steel into ingot molds and producing solid ingots, said steel being completely killed prior to its solidification into ingots, rolling the solid ingots into billets, piercing these billets in a seamless tube piercing mill and processing the resulting pierced billets into finished seamless tubes, the amount of pig iron added being sufficient to deoxidize the steel as it is made in the Bessemer converter to a degree of oxidation not exceeding that of steel of comparable carbon content made in a basic open hearth furnace and insufficient to raise the carbon content of the steel above .50 percent.

EDWIN C. WRIGHT.